Nov. 6, 1973 R. V. NORTON 3,770,819
PROCESS FOR MONOAMMONIUM TEREPHTHALATE AND TEREPHTHALIC ACID
Filed Aug. 25, 1972

United States Patent Office 3,770,819
Patented Nov. 6, 1973

3,770,819
PROCESS FOR MONOAMMONIUM TEREPHTHAL-
ATE AND TEREPHTHALIC ACID
Richard V. Norton, Wilmington, Del., assignor to Sun
Research and Development Co., Philadelphia, Pa.
Filed Aug. 25, 1972, Ser. No. 284,011
Int. Cl. C07c 63/26
U.S. Cl. 260—515 P       4 Claims

ABSTRACT OF THE DISCLOSURE

A process for making monoammonium terephthalate of high purity which comprises heating a solution of diammonium terephthalate to a temperature between about 210° C. to about 260° C., spraying said heated solution into a chamber at atmospheric or sub-atmospheric pressure, whereby liquid is evaporated and pyrolysis of said diammonium salt to the monoammonium salt occurs, and separating solid monoammonium terephthalate from said chamber. In another embodiment, the monoammonium terephthalate is converted to terephthalic acid and diammonium terephthalate, which salt is recycled.

---

Figure 1:
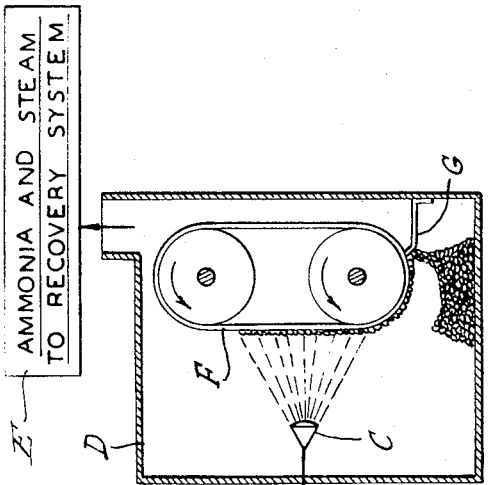

Terephthalic acid is a well known intermediate to polyester fibers and for use in such application it is necessary that the terephthalic acid be of high purity and free of nitrogen containing impurities. Thus, where terephthalic acid is derived from its monoammonium salt by pyrolysis to the acid (e.g., in accord with the process disclosed by Japanese Pat. 1965–72,835, published Sept. 4, 1969 and assigned to Nippon Soda), the starting monoammonium salt should be of high purity to avoid contamination of the acid product.

In Japanese Pat. 1965–72,835 referred to above, the process disclosed involves the heating of an aqueous solution of diammonium terephthalate at 90° to 95° C. to precipitate the monoammonium salt and thereafter subjecting the monoammonium salt to pyrolysis at 190° to 210° C. to obtain high purity terephthalic acid. It is also known from the disclosure of U.S. 3,031,500 that by heating dry diammonium isophthalate or diammonium terephthalate or a suspension of the salts in an inert solvent or partial solvent (such as water), the heating step being at a temperature above 120° C., the resultant product is the corresponding acid. Also of interest in this area is the paper by Satoh and Sogabe on "The Specific Heats of Some Solid Aromatic Acids and Their Ammonium Salts and the Atomic Heat of Nitrogen" published Dec. 1, 1939 as paper number 940 (vol. 36) of the "Scientific Papers of the Institute of Physical and Chemical Research" (Japan). This paper discloses that when neutral ammonium m-phthalate (i.e., diammonium isophthalate) was dissolved in water and evaporated several times, a mixture was obtained consisting of 45.24% m-phthalic acid (i.e., isophthalic acid) and 54.67% acid ammonium m-phthalate (i.e., the mono-ammonium salt of isophthalic acid). Similarly, M. Hajek et al., in Collection Czechoslov. Chem. Commun. vol. 36 (1971) pages 84–91 discuss their paper "Kinetics of Thermal Decomposition of Ammonium Salts of Terephthalic and Isophthalic Acids" and conclude that where crystalline diammonium terephthalate, monoammonium terephthalate and diammonium isophthalate are pyrolyzed to the acid when heated on a fluidized bed by a stream of inert gas at 100–200° C., both ammonia molecules of the salt were split off simultaneously. Thus, the art suggests that heating the diammonium salts of isophthalic and terephthalic acids leads to the dibasic acids.

It has now been found that monoammonium terephthalate may be made in high purity without the dibasic acid being formed by heating an aqueous solution of diammonium terephthalate to a temperature between about 210° C. and about 260° C., spraying said heated solution into a chamber at atmospheric or sub-atmospheric pressure, whereby liquid is evaporated and pyrolysis of said diammonium salt to the monoammonium salt occurs, and separating solid monoammonium terephthalate from said chamber. Another embodiment of this invention is a further step combined with the above where the monoammonium salt of terephthalic acid is converted to terephthalic acid and diammonium terephthalate by heating an aqueous solution of the mono-salt at about 125° C. to about 175° C. and the diammonium terephthalate which is separated from the terephthalic acid product is recycled.

The process of this invention is particularly advantageous over the above-discussed Japanese art in that a considerable savings in heat economy is realized because the spraying technique yields a higher ammonia evolution per liter of evaporated water than does boiling water ammonia release. A second distinct advantage of the spray process of this invention is that the diammonium terephthalate is at a high temperature for a minimum of time and thus amide formation is minimized. Conversely, the residence time in a boiling water reactor ($\approx$1 hr. at 250° C.) is such that it is virtually impossible to get pure monoammonium terephthalate due to amide contamination.

In order to further describe the process, reference is made to FIG. 1 which illustrates how the process may be carried out. A hold tank (A) for an aqueous diammonium terephthalate solution of from about 0.2 to about 2.5 molal and which may be held under a blanket of nitrogen or other inert gas, feeds into a heater (B) where the temperature of the solution is raised to between about 210° C. and about 260° C., and the solution then passes through a nozzle (C) which sprays the solution into a chamber (D) which is vented to an aqueous ammonia recovery system (E). Since the pressure of the chamber (D) is maintained at atmospheric or sub-atmospheric pressure the spray within the chamber (D) is vaporized and the diammonium salt is converted to the monoammonium salt. While the size and type of nozzle used in the process is not critical, the spray will preferably be very fine and any of the readily available atomizing type nozzles are satisfactory. The temperature within chamber (D) need not be controlled, the temperature being ambient, reflecting the input temperature of the diammonium salt solution. As indicated, the chamber (D) will be at atmospheric or sub-atmospheric pressure, the ammonia and water vapor (steam) being drawn off by suction or other appropriate equipment (not shown) in order to recover the ammonia and use the steam for heat exchange purposes. The monoammonium terephthalate product may be left to fall to the bottom of the chamber (D) for recovery or, as shown in the drawing, the spray may be made to impinge on a moving belt (F) and the dry or damp monoammonium salt product removed therefrom by a doctor blade (G). It will be understood that other techniques for accumulation and removal of the solid product (e.g., a moving disc) may also be employed.

As indicated above, the temperature of the aqueous diammonium terephthalate solution is brought to between about 210° C. and 260° C. The selection of temperature is preferably made in conjunction with the concentration of aqueous diammonium salt being subjected to the process. In order to achieve best results the higher temperatures will be used with the higher concentrations. Thus, at 0.2 molal, the solution will be heated at about 210–225° C. and at 2.5 molal, heating to about 250–260° C. is preferred. It will also be understood that the solution will generally be heated several degrees higher than the desired spray temperature in order to compensate for the cooling that will probably occur between the heater and the spray. It is also desirable that residence time of this solution in the heater be a minimum and it will be understood that this time will be dependent upon the type and construction of the heater which will determine its efficiency. In general, however, a heating unit should be used which will keep residence time to between about 2 and about 10 minutes, although somewhat longer times are not detrimental at the above temperature range.

After recovery of the monoammonium terephthalate product it is readily converted to the free acid by simply dispersing it in water and heating the dispersion at a temperature of from about 125° C. to about 175° C. This causes disproportionation of the mono-salt to yield a mixture of terephthalic acid and diammonium terephthalate in aqueous solution. The free acid is then simply filtered off and the diammonium salt solution recycled for further conversion to mono-salt in accord with the above described process. Since the mono-salt is of high purity its disproportionation in the aqueous system, as described above, results in terephthalic acid of extremely high purity.

In order to further illustrate the invention, the following examples are given:

EXPERIMENTAL DETAILS

A hold tank containing an aqueous solution of diammonium terephthalate at 50° C. and at various molal concentrations is pressured with nitrogen to 1200 p.s.i.g. and the solution is passed through a 0.25 inch stainless steel tube surrounded by electrical heating elements which raises the temperature of the solution to the desired experimental value. After exiting from the heater the solution is passed through an atomizing spray nozzle into a chamber open to the atmosphere and containing a moving belt made of fine mesh stainless steel cloth. The steam and ammonia vaporized escapes to the atmosphere and the sprayed material collected is on the belt and scraped to provide a damp cake of product. Nitrogen analysis provided the analytical data shown in the following table. Paper chromatographic analysis indicated that no amide impurities were formed.

tion possible at this step thereby avoiding loss of valuable product. After decolorization, the monoammonium salt is separated from the spray chamber, dispersed in water to a concentration of about 0.5 to about 1.5 molal and the dispersion heated with agitation to a temperature of from about 125° C. to about 175° C. under which conditions hydrolysis occurs. The hydrolysis reaction results in a disproportionation in accord with the following reaction scheme:

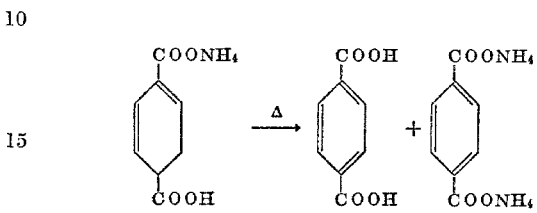

The terephthalic acid product has a much lower solubility in the aqueous system than does the diammonium salt, and, accordingly, filtration enables the terephthalic acid product to be easily separated. Filtration should be done at or slightly less than the disproportionation temperature, but it should not be done at less than 100° C. since coprecipitation of DAT with TPA will then occur.

The aqueous filtrate containing the diammonium terephthalate is recycled for further heating and conversion to the mono-salt. In this way an extremely efficient low cost process for high purity terephthalic acid is achieved.

The invention claimed is:

1. A process for making essentially pure monoammonium terephthalate which comprises heating an aqueous solution of diammonium terephthalate to a temperature between about 210° C. and about 260° C., spraying said heated solution into a chamber at atmospheric or sub-atmospheric pressure whereby the liquid phase is evaporated and conversion to solid monoammonium terephthalate devoid of free terephthalic acid occurs.

| Solution molality (moles/1,000g. H$_2$O) | Heater temp. at B (° C.) | Residence time in heater (min.) | Spray temp., ° C. | Components in product (wt. percent) | | |
|---|---|---|---|---|---|---|
| | | | | DiNH$_4$+ salt | Mono (NH$_4$+ salt) | Terephthalic acid |
| 0.2 | 225 | <5 | 210–225 | <5.0 | >95.0 | 0.0 |
| 0.5 | 150 | 10 | 145–150 | 98.6 | 1.4 | 0.0 |
| 0.5 | 200 | <5 | 193–200 | 26.8 | 73.2 | 0.0 |
| 0.5 | 235 | <5 | 222–235 | <5.0 | >95.0 | 0.0 |
| 0.5 | 250 | <5 | 237–250 | 0.0 | 87.7 | 12.3 |
| 0.5 | 300 | <5 | 290–300 | 0.0 | 42.2 | 57.8 |
| 1.0 | 150 | 10 | 145–150 | 99.5 | 0.5 | 0.0 |
| 1.0 | 200 | <5 | 190–200 | 39.1 | 60.9 | 0.0 |
| 1.0 | 241 | <5 | 235–241 | <5.0 | >95.0 | 0.0 |
| 1.0 | 250 | <5 | 240–248 | 0.0 | 93.8 | 6.2 |
| 1.0 | 300 | <5 | 293–301 | 0.0 | 49.1 | 50.9 |
| 1.5 | 150 | 10 | 145–150 | 99.2 | 0.8 | 0.0 |
| 1.5 | 200 | <5 | 191–200 | 47.1 | 52.9 | 0.0 |
| 1.5 | 247 | <5 | 240–247 | <5.0 | >95.0 | 0.0 |
| 1.5 | 250 | <5 | 246–253 | 0.0 | 95.7 | 4.3 |
| 1.5 | 300 | <5 | 287–298 | 0.0 | 54.0 | 46.0 |
| 2.5 | 260 | <5 | 250–258 | <5.0 | >95.0 | 0.0 |

It will be observed from the above data that only at spray temperatures of about 210° C. to about 260° C. are the high yields of the mono-salt obtained without the formation of terephthalic acid.

Figure 2:
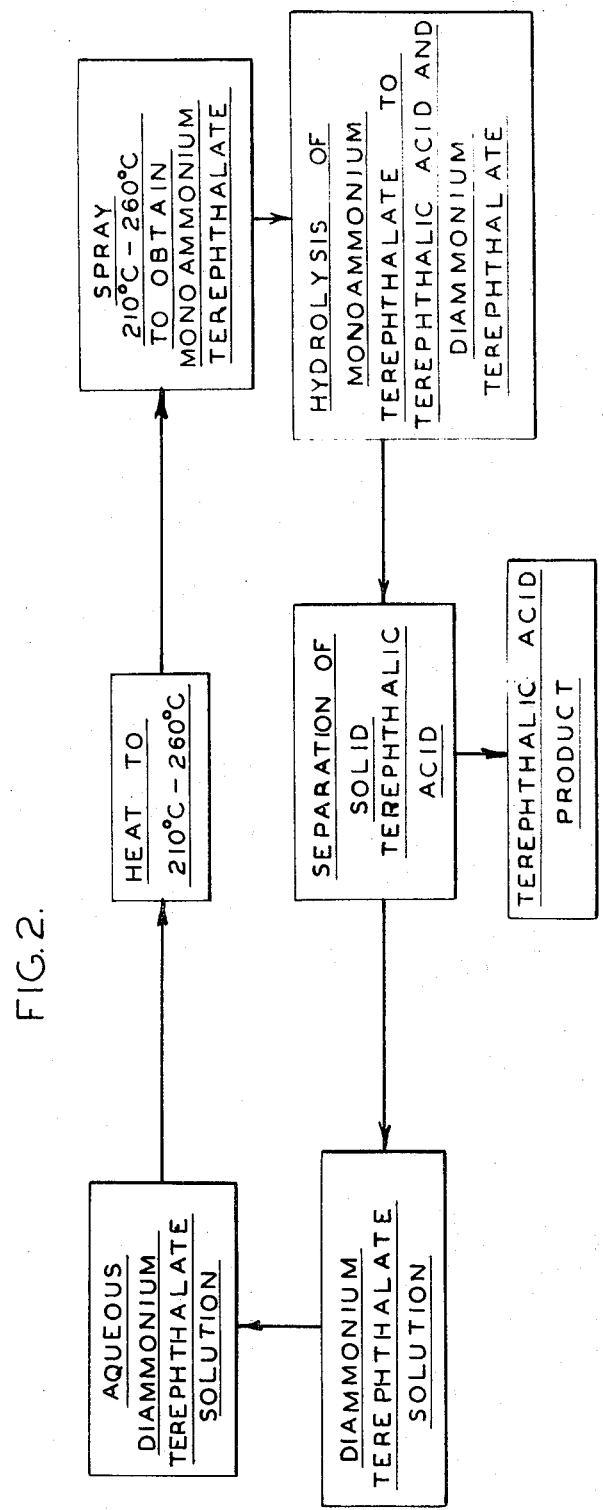

The integrated process of the invention is illustrated in FIG. 2. As indicated there, an aqueous diammonium terephthalate solution of from about 0.2 to about 2.5 molar is heated to 210° C. to 260° C. and sprayed into a chamber as discussed above where the monoammonium terephthalate is obtained in high yield and good purity. The process is particularly valuable because it permits the acid-free solution of the monoammonium salt to be treated with activated charcoal or other material to decolorize the solution and remove minor amounts of impurities without loss of desired terephthalic acid product. It is known that terephthalic acid is readily occluded onto decolorizing agents, but subject process makes purifica- 2. A process as in claim 1 where the heated diammonium terephthalate solution is sprayed onto a moving surface and monoammonium terephthalate product separated therefrom.

3. A process for making essentially pure monoammonium terephthalate which comprises heating an aqueous solution of diammonium terephthalate of from about 0.2 to about 2.5 molar to a temperature of about 210° C. to 260° C., spraying said heated solution into a chamber at atmospheric or sub-atmospheric pressure whereby the liquid phase is evaporated and conversion to solid monoammonium terephthalate devoid of free terephthalic acid occurs.

4. A process as in claim 1 where the solid monoammonium terephthalate product is separated from said chamber, dispersed in water, at a concentration of from about 0.5 to about 1.5 molal, said dispersion heated to a temperature of from about 125° C. to about 175° C. whereby said monoammonium terephthalate is converted to terephthalic acid and diammonium terephthalic, separating solid terephthalic acid at a temperature of from about 100° to about 175° C. and recycling said diammonium terephthalate solution for further conversion to monoammonium terephthalate.

References Cited
UNITED STATES PATENTS

| | | | |
|---|---|---|---|
| 3,031,500 | 4/1962 | Gasson et al. | 260—5.5 |
| 2,979,526 | 4/1961 | Gasson et al. | 260—5.5 |

OTHER REFERENCES

Arkhipova et al.: Chemical Abstracts, vol. 62 (1965), p. 5169.

Hajek et al.: Coll. Czech. Chem. Commun., vol. 36 (1971), pp. 84–91.

JAMES A. PATTEN, Primary Examiner